(12) United States Patent
Polim et al.

(10) Patent No.: US 11,853,960 B1
(45) Date of Patent: Dec. 26, 2023

(54) SYSTEMS FOR SELECTING ITEMS AND ITEM PLACEMENTS

(71) Applicant: Amazon Technologies, Inc., Seattle, WA (US)

(72) Inventors: Rico Polim, Seattle, WA (US); Andres Ignacio Ayala Armanet, Seattle, WA (US); Anthony Joseph Battista, Seattle, WA (US); Guillermo Bravo Beneitez, Seattle, WA (US); Hoda Parvin, Seattle, WA (US); Sakshi Trivedi, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 375 days.

(21) Appl. No.: 17/116,801

(22) Filed: Dec. 9, 2020

(51) Int. Cl.
| | |
|---|---|
| *G06Q 10/00* | (2023.01) |
| *G06Q 10/087* | (2023.01) |
| *G06Q 50/28* | (2012.01) |
| *G06Q 10/0631* | (2023.01) |

(52) U.S. Cl.
CPC ..... *G06Q 10/087* (2013.01); *G06Q 10/06316* (2013.01); *G06Q 50/28* (2013.01)

(58) Field of Classification Search
CPC .......... G06Q 10/087; G06Q 10/06316; G06Q 50/28
USPC .......................................................... 705/28
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 9,714,139 B1* | 7/2017 | Aggarwal | G05D 1/102 |
| 2013/0284806 A1 | 10/2013 | Margalit | |
| 2014/0364995 A1* | 12/2014 | Guan | B65G 1/1371 |
| | | | 700/217 |

* cited by examiner

*Primary Examiner* — Rokib Masud
(74) *Attorney, Agent, or Firm* — Lee & Hayes, P.C.

(57) ABSTRACT

This disclosure describes, in part, systems for recommending items and item placements within a facility. For instance, the system may receive transaction data and inventory data associated with at least the facility. The system may then use the transaction data and the inventory data to determine utility scores for items at the facility. Additionally, the system may receive data representing dimensions of the items and/or data representing dimensions of available space associated with the facility. The system may then use the utility scores, the dimensions of the items, and/or the dimensions of the available space to determine the amounts of space to provide to the items at the facility. Furthermore, the system can generate data representing an assortment of the items, where the assortment indicates at least the amounts of space, and provide the data to one or more computing devices.

20 Claims, 9 Drawing Sheets

| 204 | 206 | 208 | 210 | 212 |
|---|---|---|---|---|
| GROUP | ITEM | CATEGORY | UTILITY | M. SHARE |
| A | 1 | SANDWICH | 2 | 40% |
| A | 2 | SANDWICH | 3.5 | 60% |
| A | 3 | SNACK | .5 | 5% |
| A | 4 | SNACK | 5 | 50% |
| A | 5 | SNACK | 4 | 35% |
| A | 6 | SNACK | 2.5 | 10% |
| B | 1 | SANDWICH | .5 | 30% |
| B | 2 | SANDWICH | 1 | 70% |
| B | 3 | SNACK | 4 | 45% |
| B | 4 | SNACK | 3 | 40% |
| B | 5 | SNACK | 2.5 | 10% |
| B | 6 | SNACK | 1 | 5% |

202

| 218 | 204 | 216 |
|---|---|---|
| LOCATION | GROUP | WEIGHT |
| STORE | A | .3 |
| STORE | B | .7 |

214

| 206 | 208 | 220 | 224 |
|---|---|---|---|
| ITEM | CATEGORY | UTILITY | M. SHARE |
| 1 | SANDWICH | .95 | 33% |
| 2 | SANDWICH | 1.75 | 67% |
| 3 | SNACK | 2.95 | 33% |
| 4 | SNACK | 3.6 | 43% |
| 5 | SNACK | 2.95 | 17.5% |
| 6 | SNACK | 1.45 | 6.5% |

| IDENTIFIER | DEMAND | WIDTH | CAPACITY | LANE(S) | T. ITEMS | RESTOCKS | WASTE |
|---|---|---|---|---|---|---|---|
| A | 50 | 4 | 5 | 2 | 10 | 8 | 0 |
| B | 40 | 2 | 12 | 5 | 60 | 1 | 20 |
| C | 10 | 8 | 8 | 1 | 8 | 2 | 0 |

| 306 | 308 | 310 | 312 | 324 | 326 | 328 | 330 |
|---|---|---|---|---|---|---|---|
| IDENTIFIER | DEMAND | WIDTH | CAPACITY | LANE(S) | T. ITEMS | RESTOCKS | WASTE |
| A | 50 | 4 | 5 | 3 | 15 | 5 | 0 |
| B | 40 | 2 | 12 | 3 | 36 | 1 | 0 |
| C | 10 | 8 | 8 | 1 | 8 | 2 | 0 |

| RANK | P.C. | M.C. | IDENTIFIER | NAME | ZONE | FACEOUT |
|---|---|---|---|---|---|---|
| 1 | CAT. 1 | CAT. 3 | I.D. 1 | NAME 1 | ZONE 1 | 4 |
| 2 | CAT. 2 | CAT. 3 | I.D. 2 | NAME 2 | ZONE 1 | 4 |
| 3 | CAT. 2 | CAT. 3 | I.D. 3 | NAME 3 | ZONE 1 | 3 |
| 4 | CAT. 1 | CAT. 3 | I.D. 4 | NAME 4 | ZONE 1 | 3 |
| 5 | CAT. 2 | CAT. 3 | I.D. 5 | NAME 5 | ZONE 1 | 3 |
| 6 | CAT. 2 | CAT. 3 | I.D. 6 | NAME 6 | ZONE 1 | 2 |
| 7 | CAT. 2 | CAT. 3 | I.D. 7 | NAME 7 | ZONE 1 | 2 |
| 8 | CAT. 1 | CAT. 3 | I.D. 8 | NAME 8 | ZONE 1 | 1 |

FIG. 4

SYSTEMS FOR SELECTING ITEMS AND ITEM PLACEMENTS

BACKGROUND

Traditional physical stores maintain an inventory of items in customer-accessible areas such that customers can pick items from inventory locations and take them to a cashier for acquisition, such as purchase, rental, and so forth. For inventory at the physical stores, sales of items may be used to identify which items to offer to the customers. For example, items that have the highest level of sales may be selected for the stores. Associates may then place these items at the various inventory locations within the physical stores based on the categories of the items. For example, the physical stores may include specific inventory locations that are designated for sporting goods, clothing, jewelry, food, and/or the like.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example of determining utility scores for items, according to examples of the present disclosure.

FIG. 4 illustrates an example user interface that provides recommendations for items, according to examples of the present disclosure.

DETAILED DESCRIPTION

Figure 1:
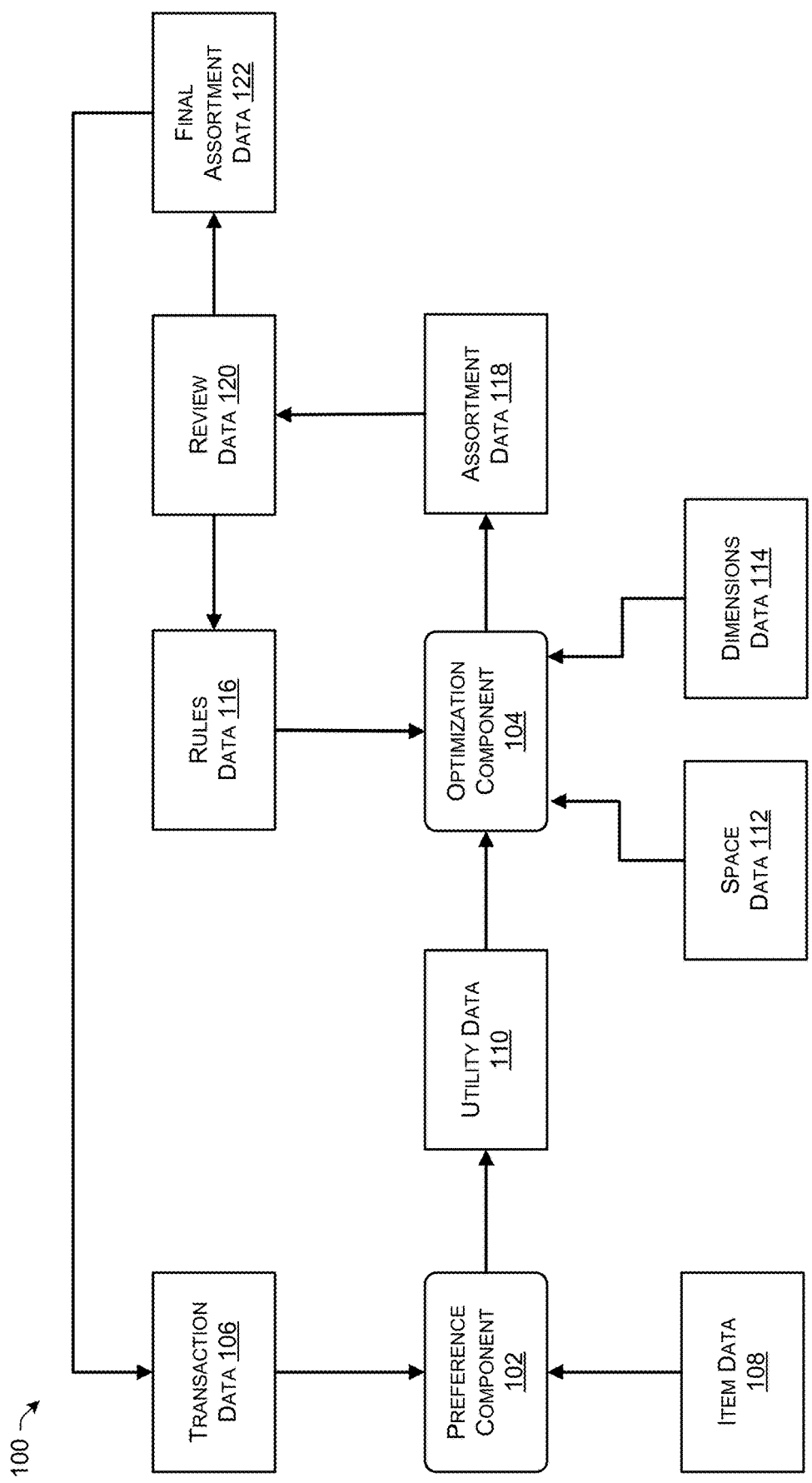
FIG. 1 illustrates an example processing pipeline for determining an assortment for items within a facility, according to examples of the present disclosure.

This disclosure describes, in part, systems and techniques for determining assortments of items. For instance, system(s) may receive transaction data associated with items at one or more facilities. The system(s) may also receive inventory data associated with items at the one or more facilities. Using the transaction data and the inventory data, the system(s) may determine utility scores for the items, where the utility scores represent at least the sales potentials for the items at the one or more facilities. The system(s) may then receive data representing dimensions of available space at a facility along with data representing dimensions of the items. Using the utility scores, the dimensions of the available space at the facility, and the dimensions of the items, the system(s) may determine assortment(s) for items provided at the facilities. An assortment may include recommend items to provide at the facility, and recommend amounts of space for displaying the items at the facility, and recommended locations for the items on inventory locations within the facility. In some instances, the system(s) determine the items, the amounts of space, and/or the locations in order to maximize revenue given the available space.

For more details, the system(s) may receive the transaction data representing acquisitions (e.g., purchase, rental, leases, etc.) of the items at one or more facilities and/or one or more online marketplaces. For example, the transaction data may represent identifiers of the items acquired, prices of the items acquired, dates and times that the items were acquired, identifiers (e.g., names, usernames, etc.) of users that acquired the items, locations where the items were acquired, and/or any other type of transaction information. In some examples, the transaction data is associated with a facility. In other examples, the transaction data is associated with more than one facility. For example, the transaction data may be associated with facilities that are located within a geographic area, such as neighborhood, city, state, country, and/or the like. In some examples, the transaction data is associated with all acquisitions of items. In other examples, the transaction data is associated with acquisitions of items over a given period of time. For example, the transaction data may be associated with acquisitions of items that have occurred between a starting date and time and an ending date and time.

The system(s) may also receive item data representing items associated with the one or more facilities. For example, the item data may represent the identifiers of the items, dates and times that the items were available at the one or more facilities, dates and times that the items will be available at the one or more facilities, the number of items that were available at the one or more facilities, attributes associated with the items, and/or any other information associated with the items. In some examples, the item data may correspond to an inventory of items that were available at the one or more facilities. In some examples, the item data may be associated with the transaction data. For a first example, if the transaction data represents sales of items that occurred at a facility over a period of time, then the item data may represent inventories of items at the facility over the period of time. For a second example, if the transaction data represents sales of items that occurred at facilities located within a geographic area, then the item data may represent inventories of items at the same facilities.

The system(s) may then analyze the transaction data and the item data using a preference component. In some examples, the preference component may include one or more artificial neural networks, one or more classifiers, one more machine-learned models, one or more algorithms, and/or the like. Based on analyzing the data, the preference component may determine utility scores for the items. As described herein, utility scores may infer items and/or item attributes that the users of the one or more facilities prefer. As such, the utility scores may represent a sales potential associated with the items at the one or more facilities. The preference component may then output utility data representing the utility scores for the items. For example, the utility data may map the identifiers of the items to the utility scores for the items.

In some examples, the preference component determines utility scores for various groups of users. For example, the system(s) may use the item data that represents the attributes associated with the items. The attributes associated with an item may include, but are not limited to, an item name, ingredients, a price, a unit count, item dimensions, an item specialty, a shelf life, nutritional facts, and/or the like. In some instances, the system(s) may also receive data representing additional attributes, such as format(s) of the facility(ies) and times associated with the acquisitions of the items. The system(s) may then use these attributes to generate the various groups of users. For instance, each group of users may be associated with unique preferences of attributes and/or items.

For a first example, the system(s) may generate a first group of users that is associated with users that prefer items with a specific ingredient, such as a type of protein (e.g., meat). For a second example, the system(s) may generate a second group of users that is associated with users that prefer a specific type of item, such as sodas. For a third example, the system(s) may generate a third group of users that is associated users that are vegetarian. Still, for a fourth example, the system(s) may generate a fourth group of users that is associated with users that prefer items with specific nutritional facts. While these are just a couple of examples of different types of groups that the system(s) may generate, in other examples, the system(s) may generate any other types of groups.

In some examples, the system(s) may generate a specific number of groups for the one or more facilities. The number of groups may include, but is not limited to, ten groups, twenty groups, fifty groups, one hundred groups, and/or any other number of groups. In some examples, the system(s) may generate at least one extra group of users that is associated with general users. For example, the system(s) may generate the extra group of users using transactional data from a syndicated market data provider. As such, and in some examples, this extra group of users may not associated with any specific preferences of attributes and/or items.

The preference component may then determine utility scores for the items for each of the groups of users using at least the attributes. For a first example, and for a first group of users that is associated with first attribute(s), the preference component may determine higher utility scores for items that include the first attribute(s) for the first group of users than utility scores that the preference component determines for the same items for a second, different group of users that is associated with second attribute(s). This is because the preference component may determine that the first group of users will prefer the items more than the second group of users because the items include the first attribute(s). For a second example, and again for a group of users that is associated with first attribute(s), the preference component may determine higher utility scores for first items that include the first attribute(s) than utility scores that the preference component determines for second items that include second, different attribute(s). This is because the preference component may determine that the group of users will prefer the first items over the second items based on the first items including the first attribute(s) associated with the group of users.

In other words, and as shown by the examples, the preference component may use the attribute(s) associated with the items, along with the attribute(s) associated with the groups of users, to determine the utility scores for the groups of users. In some examples, the preference component determines higher utility scores for items that include attribute(s) that are similar to the attribute(s) associated with a group of users then utility scores for items that include attribute(s) that are different from the attribute(s) associated with the group of users. This is because the preference component may determine that the group of users will prefer items that include specific attribute(s), which are associated with the group of users, then items that do not include the specific attribute(s). As such, the group of users will likely acquire the items that include the specific attribute(s) over the items that do not include the specific attribute(s).

Using the utilities scores for the various groups of users, the preference component may then determine final utilities scores for the items. For an example of determining a final utility score for an item, the preference component may determine that a first utility for the item is 1.0 for a first group of users, a second utility score for the item is 2.5 for a second group of users, and a third utility score for the item is 4.0 for a third group of users. The preference component may also determine that a first weight associated with the first group of users is 0.25, a second weight associated with the second group of users is 0.25, and a third weight associated with the third group of users is 0.50. As such, the preference component may determine that the final utility score for the item is 2.875 (e.g., (1.0(0.25)+2.5(0.25)+4.0(0.50))=2.875). The preference component may perform a similar analysis for each of the other items.

In the example above, the system(s) may determine the weights based on the expected number of users that the system(s) determine will visit the facility (and/or facilities) from each of the groups of users. For example, and in the example above, the system(s) may determine that 25% of the users that visit the facility will likely be included in the first group of users, which is why the first weight is 0.25. Additionally, the system(s) may determine that 25% of the users that visit the facility will likely be included in the second group of users, which is why the second weight is also 0.25. Finally, the system(s) may determine that 50% of the users that visit the facility will likely be included in the third group of users, which is why the third weight is 0.50. In such examples, the system(s) may determine the weights using the transaction data (e.g., the transaction data from the one or more facilities and/or the transaction data from Nielsen).

The system(s) may then use the utility data to determine assortment recommendations for the items. For example, the system(s) may receive data representing available space within a facility. In some examples, the available space may indicate the total amount of space (e.g., shelf space, bin space, freezer space, refrigerator space, etc.) for placing items within the facility. Additionally, in some examples, the available space may be segmented into various zones within the facility. For example, the data may indicate a first amount of space for a first category of items (e.g., shelf space and bin space for sporting equipment), a second amount of space for a second category of items (e.g., refrigerator space and freezer space for food items), a third amount of space for a third category of items (e.g., floor space for machinery), and/or so forth.

The system(s) may also receive data representing dimensions of the items. For example, and for an item, the data may represent the height, length, and width associated with the item. The system(s) may then analyze the utility data, the data representing the available space within the facility, and the data representing the dimensions of the items using an optimization component. In some examples, the optimization component may include one or more artificial neural networks, one or more classifiers, one more machine-learned models, one or more algorithms, and/or the like. Based on analyzing the data, the optimization component may determine the assortments for items within the facility. In some examples, the assortment include a selection of items, amounts of space to provide to the items, and/or locations for placing the items on inventory location(s).

For example, the optimization component may determine a first item should be provided a first amount of space at a first location on a shelf, a second item should be provided a second amount of space at a second location on the shelf, a third item should be provided a third amount of space at a third location on the shelf, and/or so forth. In some example, the optimization component may indicate the amount of space to provide to an item by indicating a number of lanes (and/or a number of faceouts) for the item. For example, the optimization component may indicate that there should be two lanes of the item included on a shelf. Additionally, or alternatively, in some examples, the optimization component may indicate the amount of space to provide to an item by indicating the width of an inventory location that should be provided to the item. For example, the optimization component may indicate that 15 inches of a shelf should be provided to the item.

In some examples, the optimization component determines the amounts of space to provide to the items in order to reduce costs within the facility and maximize the revenue. To do this, the optimization component may use the utility scores to determine the demands for the items over a period of time. The period of time may include, but is not limited to, one hour, one day, one week, one month, and/or any other period of time. In some examples, the optimization component determines the demand for an item using a total number of expected units sold at a facility (e.g., as input by a user) and the utility scores. For example, suppose that the total number of expected units sold at the facility is 100 units. Also, suppose that there are ten items, each with a utility score of 2. Therefore, the optimization component may determine, for each item, a ratio of the item's utility score to the total utility scores (e.g., 2/20) for the items. The optimization component may then determine the demand for an item by multiplying the ratio by the total number of units. This would be a total of 10 units for each item (e.g., (100*(2/20))=10). While this is just one example technique of determining demands for items, in other examples, the optimization component may use additional and/or alternative techniques.

The optimization component also uses the data representing the available space in order to determine the available space that is provided to a category of items. Furthermore, the optimization component may use the data representing the dimensions of the items in order to determine the number of items that may be placed within the available space. The optimization component then uses the demand for the items along with the number of items that may be placed within the available space in order to determining an assortment of the items that reduces the costs.

For an example of determining an assortment for the items, the optimization component may determine that the three items with the top three utility scores are to be placed on a shelf that includes twenty-four inches of width. The optimization component may initially allocate eight inches of width of the shelf to the first item, eight inches of the width of the shelf to the second item, and eight inches of the width of the shelf to the third item. Based on the utility scores, the optimization component may determine that the demand for the first item is fifty units per day, the demand for the second item is twenty-five units per day, and the demand for the third item is also twenty-five units per day. Additionally, based on the dimensions of the items, the optimization component may determine that, given the respective allocated space for each item, the shelf may hold ten units of the first item, twenty units of the second item, and twenty units of the third item.

The optimization component may then determine the costs for the current allocation of the items given the demands. In some examples, the costs are based on the number of restocks that would be required for the items. For example, the optimization component may determine that an item needs to be restocked whenever 70% of the units of the item are removed from the inventory location (e.g., when 30% of the units of the item remain at the inventory location). As such, and using the numbers above, the optimization component may determine that the first item would require 8 restocks per day (e.g., 50/(10*0.7)=7.143, but rounding up), the second item would require 2 restocks per day (e.g., 25/(20*0.7)=1.876, but rounding up), and the third item would require 2 restocks per day (e.g., 25/(20*0.7)=1.876, but rounding up). Since the first item would require 8 restocks and the second and third items would only require 2 restocks, the optimization component may determine to allocate more space to the first item and less space to the second and third items in order to reduce the number of restocks (and as such, reduce the labor costs).

For example, the optimization component may then allocate twelve inches of width of the shelf to the first item, six inches of the width of the shelf to the second item, and six inches of the width of the shelf to the third item. Based on the dimensions of the items, the optimization component may then determine that, given the allocated space for each item, the shelf may hold fifteen units of the first item, fifteen units of the second item, and fifteen units of the third item. As such, and using the numbers above, the optimization component may determine that the first item would now require 5 restocks per day (e.g., 50/(15*0.7)=4.762, but rounding up), the second item would require 3 restocks per day (e.g., 25/(15*0.7)=2.381, but rounding up), and the third item would require 3 restocks per day (e.g., 25/(15*0.7)=2.381, but rounding up). As such, the total number of restocks for the items was reduce from 12 restocks (e.g., 8+2+2=12) to 11 restocks (e.g., 5+3+3=11). This may reduce the total costs for the facility. In some examples, the optimization component may continue to adjust the allocated spaces for the items until the optimization component determines the allocation that provides the lowest costs and/or the highest revenue. In some examples, the optimization component may perform similar processes for the other items within the facility.

While the example above describes restocking an item whenever 70% of the units of the item have been removed from the inventory location, in other examples, the optimization component may use a different percentage for determining when to restock the items. Additionally, while the example above describes determining an allocation of items for three items, in other examples, the optimization component may perform similar processes to determine an allocation of items for any number of items.

In some examples, in addition to, or alternatively from, using the costs, the optimization component may use data representing rules when determining the assortments for the items. The rules may include, but are not limited to, a rule to include items that are currently in inventory, a rule to include items with various prices (e.g., include high priced items, medium priced items, and low priced items), a rule to include items that have specific attributes (e.g., nutritional facts), a rule to segment items based on various time periods (e.g., include specific items in the morning, specific items at lunch, specific items in the afternoon, etc.), a rule to include a specific number of different items for various categories (e.g., include ten different types of soda), a rule to include specific items (e.g., including a specify type of soda), and/or any other rule. The optimization component may then use one or more of these rules when determining the assortments.

For a first example, if a rule indicates that the optimization component may only include items that are currently in inventory, then the optimization component may perform the processes above by initially selecting items that are currently in stock for the assortment (e.g., select ten items that are in stock and have the highest utility scores). For a second example, if a rule indicates that the optimization component needs to require at least ten different items within a specific category of items (e.g., include ten different types of soda), then the optimization component may perform the processes above by initially selecting at least the ten items with the highest utility scores that are associated with the specific category of items. Still, for a third example, if a rule indicates that the optimization component must include items with various prices, then the optimization component may perform the processes above by initially selecting at least one item that is associated with high priced items and includes the highest utility score from among the high priced items, at least one item that is associated with the medium priced items and includes the highest utility score from among the medium priced items, and at least one item that is associated with low priced items and includes the highest utility score from among the low priced items.

In some examples, one or more users may review the assortment and manually make one or more changes to the assortment. For example, the one or more users may determine that an additional item should be included in a category of items and as such, may manually add the item to the assortment of items. When the one or more users are finished, the system(s) may generate data representing the final assortment of items. For example, the data may represent at least identifiers of items, categories of the items, names of the items, zones for the items, and the amounts of space (e.g., faceouts) to provide to the items. A facility may then use this data for providing items to users.

In some examples, the system(s) may train the components (e.g., the preference component and the optimization component). For example, the system(s) may train the components using the data described herein, such as the transaction data, the item data, the space data, the dimensions data, the assortment data, the final assortment data, and/or the like. In some examples, by inputting at least the assortment data and the transaction data, the system(s) train the components using knows results, such as the knows assortments of the items and the known transactions that occurred at the one or more facilities when using those know assortments of items. In some examples, training the components may include adjusting weights and/or parameters associated with the components using the data.

For example, the system(s) may input, into the preference component, at least the transaction data representing the transactions at the one or more facilities and the assortment data representing the assortments of items that are associated with the transactions. For example, the transaction data and the assortment data may indicate that given items included in assortments of items had higher numbers of transactions than other items included in assortments of items at the one or more facilities. As such, the system(s) may use such data to update the weights and/or parameters of the preference component. This way, when later analyzing data, the preference component may provide higher utility scores for those items that included the higher numbers of transactions so that those items are more likely to be included in assortments of items within the one or more facilities.

For another example, the system(s) may input, into the optimization component, at least the transaction data representing the transactions at the one or more facilities and the assortment data representing the assortments of items that are associated with the transactions. For example, the transaction data and the assortment data may indicate that given assortment of items included higher numbers of transactions than other assortments of items at the one or more facilities. As such, the system(s) may use such data to update the weights and/or parameters of the optimization component. This way, when later analyzing data, the optimization component may output assortments of items that provide the highest levels of transactions.

In some examples, the system(s) may continue to train, using the processes above, the components as the system(s) continue to receive new data from the one or more facilities. This way, the components may provide the best recommendations when analyzing data.

In some examples, any type of machine learning model may be used consistent with this disclosure. For example, machine learning models or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

FIG. 1 illustrates an example processing pipeline 100 for determining an assortment for items within a facility, according to examples of the present disclosure. As shown, the processing pipeline 100 may include at least a preference component 102 and an optimization component 104. In some instances, the preference component 102 is configured to analyze data in order to determine user preferences of items within one or more facilities. Additionally, the optimization component 104 is configured to analyze data in order to determine assortments for the items within the one or more facilities. The preference component 102 and/or the optimization component 104 may each include, but are not limited to, one or more artificial neural networks, one or more classifiers, one or more machine-learned models, one or more algorithms, and/or the like.

As shown, the preference component 102 may receive, as inputs, transaction data 106 and item data 108. As discussed above, the transaction data 106 may represent acquisitions of items at one or more facilities and/or one or more online marketplaces. For example, and for an acquired item, the transaction data 106 may represent at least an identifier associated with the item, a price of the item, a date and time that the item was acquired, an identifier associated with the facility and/or online marketplace for which the item was acquired, an identifier associated with a user that acquired the item, a location of the item within the facility, and/or any other transaction information. The transaction data may represent similar information for each of the other items represented by the transaction data. As used herein, an identifier may include a name, a numerical identifier, an alphabetic identifier, a mixed numerical and alphabetic identifier, and/or any other type of identifier that may be used to identify an item, a user, a facility, and/or the like.

For a first example, the identifier associated with a user may include, but is not limited to, a name of the user, a username associated with the user, a user account associated with the user, and/or the like. For a second example, an identifier associated with an item may include, but is not limited to, a name of the item, a number associated with the item, a code associated with the item, and/or any other type of identifier that can be used to identify the item. Still, and for a third example, an identifier associated with a facility may include, but is not limited to, a name of the facility, a number associated with the facility, a code associated with the facility, and/or any other type of identifier that may be used in order to identify the facility.

The item data 108 may represent items that are available at the one or more facilities. For example, the item data 108 may represent the identifiers of the items, dates and times that the items were available at the one or more facilities, dates and times that the items will be available at the one or more facilities, the number of items that were available at the one or more facilities, and/or any other item information. In some examples, the item data 108 may correspond to an inventory of items that were available at the one or more facilities. In some examples, the item data 108 may be associated with the transaction data 106. For a first example, if the transaction data 106 represents sales of items that occurred at a facility over a period of time, then the item data 108 may represent at least inventory of items at the facility over the period of time. For a second example, if the transaction data 106 represents sales of items that occurred at facilities located within a geographic area, then the item data 108 may represent inventory of items at the same facilities.

The preference component 102 may analyze the transaction data 106 and the item data 108 in order to generate utility data 110 representing utility scores for the items. For example, the utility data 110 may at least map the identifiers of the items to the utility scores determined by the preference component 102. In some examples, a utility score associated with an item corresponds to the utility that the item provides to users (e.g., the sales potential for the item). For example, when acquiring an item, users may initially identify the category of items (e.g., sporting goods, food, clothing, games, multimedia, etc.) for which the users are shopping. The users may then analyze attributes associated with each of the items included in the category of items and select the item that provides the highest utility for the users. As such, the preference component 102 may determine the utility scores for the items by mapping these attributes to the categories and purchasing decisions.

For example, if the preference component 102 determines that there is a high likelihood that an item will be chosen by users, based on the attributes and sales of the item, then the preference component 102 may assign a high utility score to the item. Additionally, if the preference component 102 determines that there is a low likelihood that an item will be chosen by users, based on the attributes and sales of the item, then the preference component 102 may assign a low utility score to the item. In some examples, the preference component 102 determines utility scores using a range (e.g., between −10 and 0, between 0 and 10, etc.).

In some examples, the preference component 102 may use sales and/or attributes of related item(s) in order to determine a utility score for an item. For example, the preference component 102 may analyze the transaction data 106 and, based on the analysis, determine that sales for a first item are high at a facility. The preference component 102 may also analyze the item data 108 and, based on the that analysis, determine that first attribute(s) associated with the first item are similar to second attribute(s) associated with a second item. For example, the preference component 102 may determine that one or more of the first attributes (and/or a threshold number and/or threshold percentage of the first attributes) match one or more of the second attributes. As such, the preference component 102 may determine that the second item is similar to the first item. Based on the high sales of the first item, and based on the second item being similar to the first item, the preference component 102 may also assign a high utility score to the second item.

In some examples, the preference component 102 initially determines utility scores for the items for various groups of users. As discussed above, the system(s) may determine the groups of users based on unique preferences of attributes and/or items. The preference component 102 may then use the utility scores determined for the various groups of users in order to determine final utility scores for the items. For example, the preference component 102 may use the utility scores determined for the various groups of users, along with weights that are determined for the various groups of users, in order to determine the final utility scores for the items. Examples of determining the final utility scores for items are described in more detail with regard to FIG. 2.

As also shown in the example of FIG. 1, the optimization component 104 may receive, as inputs, the utility data 110 from the preference component 102, space data 112, dimensions data 114, and/or rules data 116. The space data 112 may represent the available space within a facility. As discussed above, the available space may indicate the total amount of space (e.g., shelf space, bin space, freezer space, refrigerator space, etc.) for placing items within the facility. Additionally, in some examples, the available space may be segmented into various zones within the facility.

For a first example, the space data 112 may indicate a first amount of space for a first category of items (e.g., shelf space and bin space for sporting equipment), a second amount of space for a second category of items (e.g., refrigerator space and freezer space for food items), a third amount of space for a third category of items (e.g., floor space for machinery), and/or so forth. For a second example, the space data 112 may indicate a first amount of freezer space for freezer items, a second amount of refrigerator space for refrigerated items, and a third amount of space for all other items (e.g., items that do not need to be placed in the freezer or refrigerator). Still for a third example, the space data 112 may indicate a first amount of space that is associated with front-of-house area(s) of the facility and a second amount of space that is associated with back-of-house area(s) of the facility. In this example, a front-of-house area is where users shop for items and a back-of-house area is for storage of items.

The dimensions data 114 may represent the dimensions for the items from the item data 108. For example, and for an item, the dimensions data 114 may represent an identifier of the item, a height of the item, a length of the item, a width of the item, and/or any other dimensions. The dimension data 114 may represent similar information for each of the other items.

Figure 5:
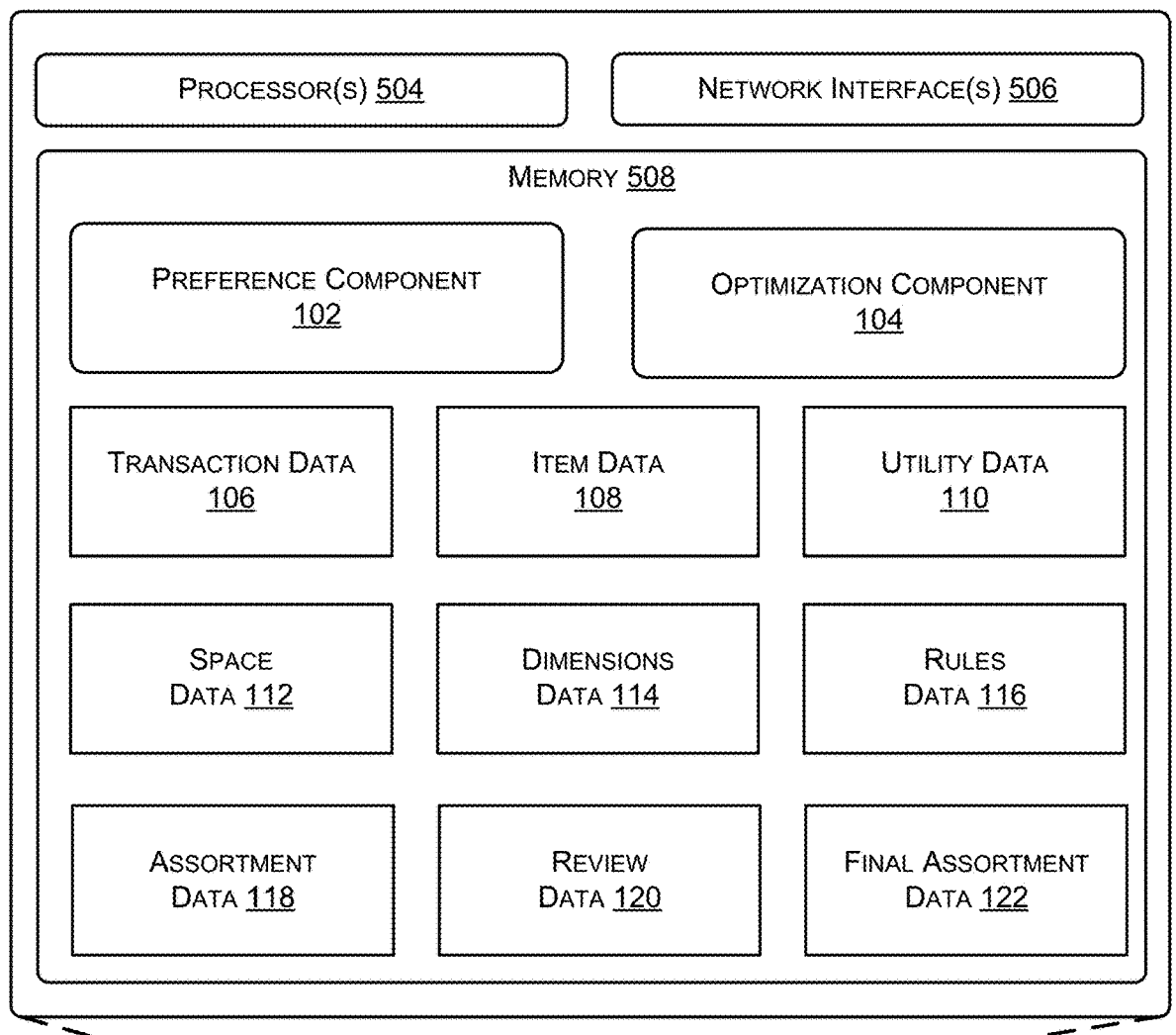
FIG. 5 illustrates a block diagram of an example architecture of system(s), according to examples of the present disclosure.
Figure 5:
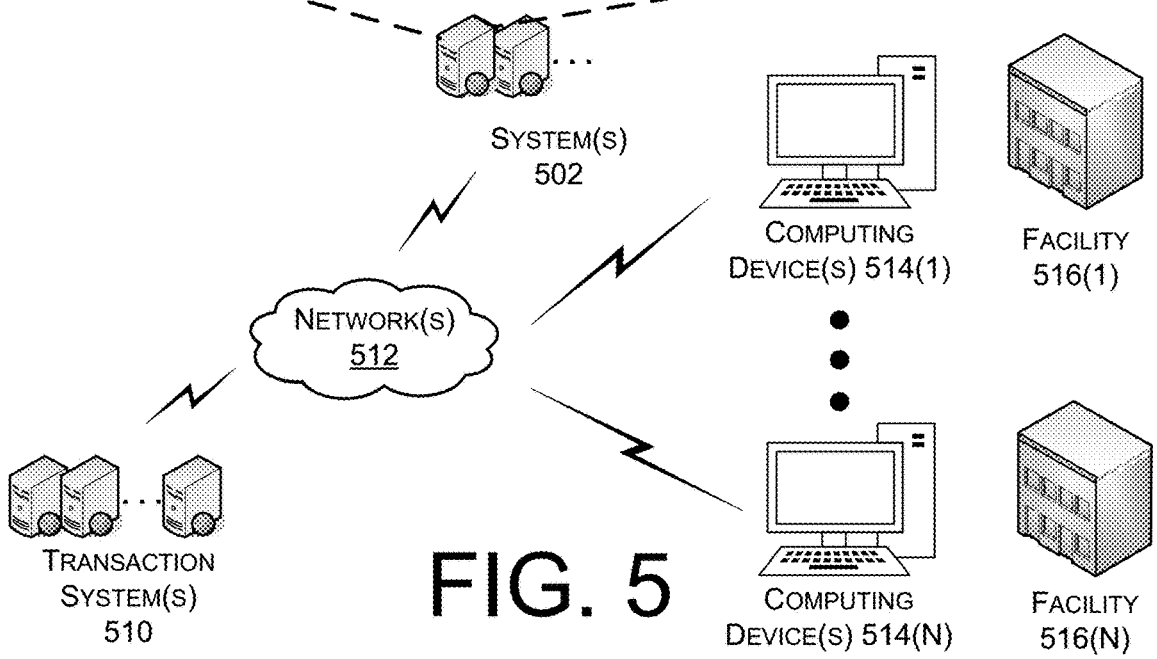

The rules data 116 may represent one or more rules that the optimization component 104 uses when determining assortments of items. As discussed above, the rules may include, but are not limited to, a rule to include items that are currently in inventory, a rule to include items with various prices (e.g., include high priced items, medium priced items, and low priced items), a rule to include items that have specific attributes (e.g., nutritional facts), a rule to segment items based on various time periods (e.g., include specific items in the morning, specific items at lunch, specific items in the afternoon, etc.), a rule to include a specific number of different items for various categories (e.g., include ten different types of soda), a rule to include specific items (e.g., including a specify type of soda), and/or any other rule. In some examples, and as illustrated in FIG. 5, the system(s) may receive the rules data from one or more computing devices.

The optimization component 104 may analyze the utility data 110, the space data 112, the dimensions data 114, and/or the rules data 116 in order to generate assortment data 118 representing an initial assortment of the items. For example, the assortment data 118 may represent identifiers of the items to include in the assortment, the amounts of space (e.g., number of faceouts, number of lanes, etc.) to provide for the items within the facility, the zones for placing the items, the locations within the facility for placing the items, and/or any other assortment information. In some examples, the assortment data 118 is generated for a facility. In some examples, the assortment data 118 is generated for more than one facility. For example, the assortment data 118 may be generated for facilities that are located within a geographic area.

Figure 3A:
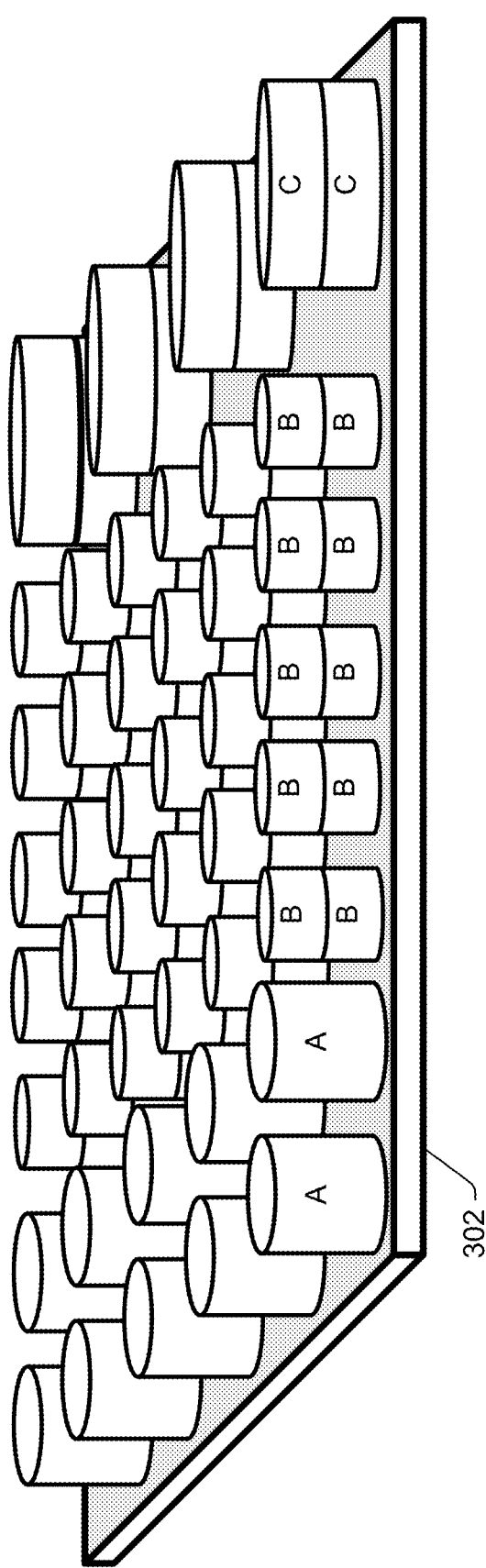
FIGS. 3A-3B illustrate an example of determining an assortment for items, according to examples of the present disclosure.
Figure 3B:
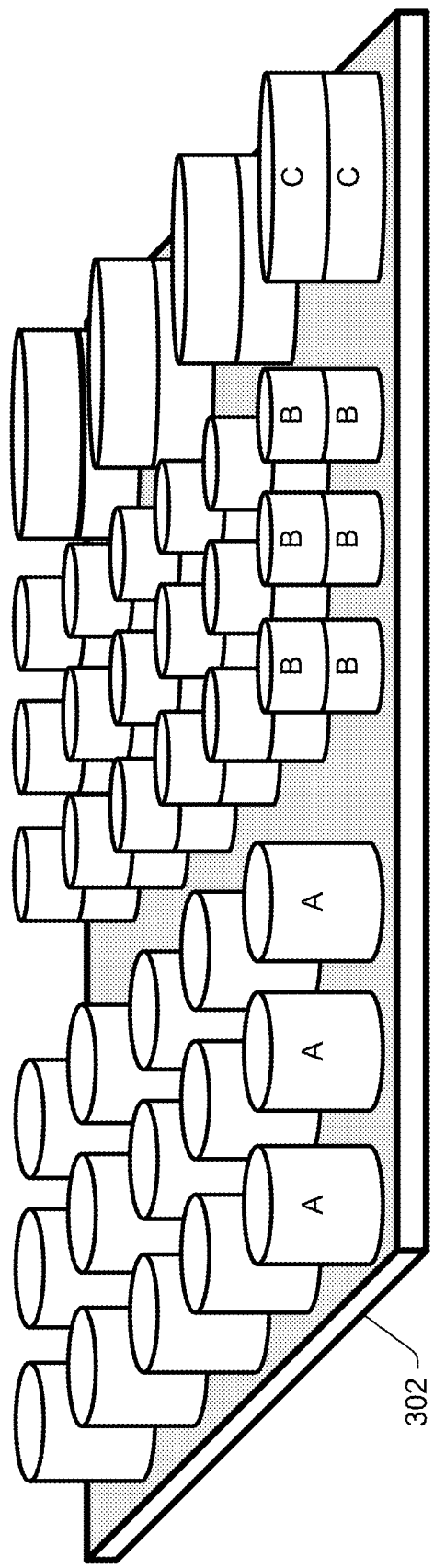

In some examples, the optimization component 104 determines the assortment of items in order to both maximize the attribute coverage of the available space within the facility and maximize the profit for the facility. For example, the optimization component 104 may use the data to determine the profits per units of the items, the expected units that will sell for the items (e.g., the demands for the items), and the utility scores for the items. The optimization component 104 may then determine various costs, such as unit costs for the items, labor costs for restocking the items, and/or any other costs. The optimization component 104 then uses the profits per units of the items, the expected units that will sell for the items, the utility scores for the items, and the costs in order to determine the optimal assortment of the items. An example of determining the optimal assortment for the items is illustrated in FIGS. 3A-3B.

As further illustrated in the example of FIG. 1, the system(s) may receive review data 120 associated with the assortment of items. For example, after generating the assortment data 118, the system(s) may send the assortment data 118 to one or more computing devices. Users associated with the one or more computing devices may then receive inputs representing one or more changes to the assortment of items as determined by the optimization component 104. The one or more changes may include, but are not limited to, adding an item, removing an item, changing an amount of space provided to an item, changing a location within the facility for the item, and/or any other change that may be made to the assortment of items. The system(s) may then receive the review data 120 representing the changes and update the assortment of items using the review data 120. For example, the system(s) may update the assortment of items by making one or more of the changes represented by the review data 120. The system(s) may then generate final assortment data 122 representing the final assortment of items.

As further illustrated in the example of FIG. 1, the processing pipeline 100 may continuously repeat. For example, while a facility is implementing the final assortment of items represented by the final assortment data 122, the system(s) may continue to receive new transaction data 106 associated with the acquisition of items at the facility. In some examples, the system(s) may also receive new item data 108 representing an updated list of items that are available. The preference component 102 may then analyze, using the processes described herein, the new transaction data 106 and/or the new item data 108 in order to generate new utility data 110, where the new utility data 110 represents new utility scores for the items.

Furthermore, the system(s) may receive new space data 112 representing an update available space at the facility, new dimensions data 114 for any new items represented by the new item data 108, and new rules data 116 representing new rules. The optimization component 104 may then analyze the new utility data 110, the new space data 112, the new dimensions data 114, and/or the new rules data 116 in order to generate new assortment data 118 for the facility. In other words, the system(s) may continuously use the processing pipeline 100 in order to continuously update the assortment of items for the facility.

In some examples, the data used by the processing pipeline 100 may be associated with a specific time of the year. For example, since sales at a facility area likely to change based on the time of year (e.g., cold products may sell better in the summer while hot products sell better in the winter), the processing pipeline 100 may use data that is associated different times of the year so that the assortments of items at the facility are updated during the different times of the year. Additionally, in some examples, the system(s) may provide the final assortment data 122 to new facilities. For example, if a new facility is being started in a geographic area that already includes another facility, the system(s) may provide the final assortment data 122 associated with the other facility to the new facility. This way, the new facility is provided with an assortment of items even before sales occur at the new facility. Additionally, as the sales begin to occur at the new facility, the system(s) may use transaction data 106 representing the new sales in order to update the assortment of items for the new facility.

FIG. 2 illustrates an example of determining utility scores for items, according to examples of the present disclosure. As shown, first data 202 (which may represent, and/or include, utility data 110) may represent utility scores for two different groups of users. For example, the first data 202 may represent identifiers 204 associated with the groups (e.g., Group "A" and Group "B"), identifiers 206 associated with the items (e.g., Item "1", Item "2", Item "3", Item "4", Item "5", and Item "6"), identifiers 208 associated with categories which the items are included (e.g., Category "Sandwich" and Category "Snack"), utility scores 210 for the items, and market shares 212 associated with the items.

As shown, the preference component 102 determines, for the groups, different utility scores 210 for the same item. For a first example, Item "1" includes a utility score 210 of "2" for Group "A" and a utility score of "0.5" for Group "B". This may be because the users included in Group "A" prefer Item "1" and/or attributes associated with Item "1" more than the users included in Group "B". Additionally, Item "3" includes a utility score 210 of "0.5" for Group "A" and a utility score of "4" for Group "B". This may be because the users included in Group "B" prefer Item "3" and/or the attributes associated with Item "3" more than the users included in Group "A".

As further shown, the first data 202 indicates that there are different market shares 212 for the different groups. For a first example, Item "1" includes a market share 212 of "40%" for Group "A" and a market share 212 of "30%" for Group "B". This may indicate that, for the Category "Sandwich", users included in Group "A" prefer Item "1" over Item "2" while users included in Group "B" prefer Item "2" over Item "1". Additionally, Item "3" includes a market share 212 of "5%" for Group "A" and a market share of "45%" for Group "B". This may indicate that, for the Category "Snacks", users included in Group "A" prefer Item "3" the least as compared to the other items while users included in Group "B" prefer Item "3" over the other items.

As further illustrated in the example of FIG. 2, second data 214 may represent weights 216 for the groups at a given location. where the second data 214 represents identifiers 218 associated with the location. In some examples, the location may be associated with a single facility. In some examples, the location may be associated with one or more facilities located within a geographic area (e.g., a city). The weights 216 may represent the percentage of users that are expected from each of the groups at the location. For a first example, if the location is associated with a facility, then the system(s) expect that 30% of the users at the facility will be included in the Group "A" and 70% of the users at the facility will be included in Group "B". For a second example, if the location is associated with facilities located within a geographic area, then the system(s) expect that 30% of the users at the facilities will be included in the Group "A" and 70% of the users at the facilities will be included in Group "B".

As further illustrated in the example of FIG. 2, the preference component 102 determines, for the location, final utility scores 220 for the items, which is represented by third data 222 (which may also represent, and/or include, utility data 110). To determine the final utility scores 220, the preference component 102 may use the utility scores 210 and the weights 216. For a first example, the preference component 102 may determine that a final utility score 220 for Item "1" is the utility score 210 for Item "1" for Group "A" multiplied by the weight 216 associated with Group "A" plus the utility score 210 for Item "1" for Group "B" multiplied by the weight 216 associated with Group "B". As shown, the final utility score 220 for Item "1" is "0.95" (e.g., (2(0.3))+(0.5(0.7))=0.95). For a second example, the preference component 102 may determine that a final utility score 220 for Item "2" is the utility score 210 for Item "2" for Group "A" multiplied by the weight 216 associated with Group "A" plus the utility score 210 for Item "2" for Group "B" multiplied by the weight 216 associated with Group "B". As shown, the final utility score 220 for Item "2" is "1.75" (e.g., (3.5(0.3))+(1.75(0.7))=1.75). In the example of FIG. 2, the preference component 102 may perform similar processes to determine the final utility scores 220 for each of the other items.

As further illustrated in the example of FIG. 2, the third data 220 may represent final market shares 224 for the items at the location. To determine the final market shares 224, the preference component 102 may use the market shares 212 and the weights 216. For a first example, the preference component 102 may determine that a final market share 224 for Item "1" is the market share 212 for Item "1" for Group "A" multiplied by the weight 216 associated with Group "A" plus the market share 212 for Item "1" for Group "B" multiplied by the weight 216 associated with Group "B". As shown, the final market share 224 for Item "1" is "33%" (e.g., (40%(0.3))+(30%(0.7))=33%). For a second example, the preference component 102 may determine that a final market share 224 for Item "2" is the market share 212 for Item "2" for Group "A" multiplied by the weight 216 associated with Group "A" plus the market share 212 for Item "2" for Group "B" multiplied by the weight 216 associated with Group "B". As shown, the final market share 224 for Item "2" is "67%" (e.g., (60%(0.3))+(70% (0.7))=67%). In the example of FIG. 2, the preference component 102 may perform similar processes to determine the final market shares 224 for each of the other items.

It is noted that, while these are just a couple of techniques that the preference component 102 may use to determine the final utility scores 220 and/or the final market shares 224, in other examples, the preference component 102 may use one or more additional and/or alternative techniques. For instance, in some examples, the preference component 102 may not use the weights 216 when determining the final utility scores 220 and/or the final market shares 224. Rather, the preference component 102 may take the average of the utility scores 210 for the items to determine the final utility scores 220 and/or take the average of the market shares 212 for the items to determine the final market shares 224.

FIGS. 3A-3B illustrate an example of determining an assortment for items, according to examples of the present disclosure. As shown in the example of FIG. 3A, at a first time, an inventory location 302 (e.g., a shelf) within a facility may include a number of items. The system(s) may receive and/or generate first data 304 (which may represent, and/or include, assortment data 118) representing the items located at the inventory location 302. As shown, the first data 304 represents at least identifiers 306 of the items, demands 308 for the items, widths 310 of the items, lane capacities 312 for the items, number of lanes 314 for the items, and total items 316 at the inventory location 302.

In some examples, the optimization component 104 may determine one or more portions of the first data 304. For example, the optimization component 104 may determine the demands 308 for the item using the utility scores associated with the items. For example, the optimization component 104 may determine that Item "A" includes the highest demand 308 based on Item "A" including the highest utility score among the items. Additionally, the optimization component 104 may determine that Item "C" includes the lowest demand 308 based on Item "C" including the lowest utility score among the items. While the optimization component 104 may use the utility scores to determine the demands 308, in other examples, the optimization component 104 may use additional and/or alternative data to determine the demands 308 (e.g., transaction data 106 representing sales of the items).

The optimization component 104 may determine the widths 310 of the items using dimension data 114. Furthermore, the optimization component 104 may determine the lane capacities 312 for the items using the dimensions of the items, which is represented by the dimension data 114, and the dimensions of the inventory location 302, which may be represented by space data 112. For example, and for an item, the optimization component 104 may determine a number of items that may be placed between the front of the inventory location 302 and the back of the inventory location 302. The optimization component 104 may also determine a number of items that may be placed on top of one another (e.g., the number of items that may be stacked on top of one another). The optimization component 104 may then determine the lane capacity 312 for the item based on the number of items that may be placed between the front of the inventory location 302 and the back of the inventory location 302 and the number of items that may be placed on top of one another.

For example, and with regard to Item "C", the optimization component 104 may determine that four units of Item "C" may be placed between the front of the inventory location 302 and the back of the inventory location 302. Additionally, the optimization component 104 may determine that two units of Item "C" may be placed on top of one another. As such, the optimization component 104 may determine that the lane capacity 312 for Item "C" is "8" units (e.g., (4*2)=8). The optimization component 104 may perform similar processes for determining the that the lane capacity 312 for Item "A" is "5" units and the lane capacity 312 for Item "B" is "12" units.

The optimization component 104 may also determine the number of lanes 314 that the items occupy. In some instances, the optimization component 104 determines the number of lanes 314 using the dimensions of the items and the dimensions of the inventory location 302. For example, the optimization component 104 may use the widths 310 of the items and the width of the inventory location 302 to determine the number of lanes 314 for each item. In other examples, the optimization component 104 determines the number of lanes 314 based on receiving data representing the number of lanes 314 (e.g., a user may input the number of lanes 314 into one or more computing devices). The optimization component 104 may then determine the total items 316 using the lane capacities 312 and the current number of lanes 314.

For example, and for Item "A", the optimization component 104 may determine that the total items 316 is the lane capacity 312 for Item "A" multiplied by the current number of lanes 314 for Item "A". In the example of FIG. 3A, the optimization component 104 may determine that the total items 316 for Item "A" is "10" units (e.g., (5*2)=10). The optimization component 104 may perform similar processes to determine that the total items 316 for Item "B" is "60" units and the total items 316 for Item "C" is "8" units.

The optimization component 104 may then determine a first cost associated with the assortment of items illustrated in FIG. 3A. In some examples, the first cost includes at least the labor cost associated with restocking the items, which is represented by restocks 318. To determine the labor cost, the optimization component 104 may determine an event that occurs to trigger restocking of the items. For example, the optimization component 104 may determine to restock the items based on 70% of the overall capacity for the item on the inventory location 302 being removed. The optimization component 104 may then use that percentage to determine the number of times that each of the items will likely be restocked over a given period of time. The given period of time may include, but is not limited to, one day, two days, one week, one month, and/or any other period of time.

For example, and with regard to Item "A", the optimization component 104 may determine the number of times that Item "A" is likely to be restocked by dividing the demand for Item "A" by the total items 316 for Item "A" multiplied by the percentage of items removed before restocking is required. For instance, and using the example above where the percentage is 70%, the optimization component 104 may determine that the number of times is "8" times (e.g., (50/(10*0.7))=7.143, which is rounded up to 8). The optimization component 104 may perform a similar process to determine that the number of times that Item "B" is likely to be restocked is "1" time (e.g., (40/(60*0.7))=0.9524, which is rounded up). Additionally, the optimization component 104 may perform a similar process to determine that the number of times that Item "C" is likely to be restocked is "2" times (e.g., (10/(8*0.7))=1.786, which is rounded up).

The optimization component 104 may also determine a second cost associated with the assortment of items in FIG. 3A. The second cost, which may also be referred to as waste cost or a shrink cost, may be associated with waste from items that are perishable. For example, the optimization component 104 may determine a waste 320 associated with the items using the assortment. In some examples, the optimization component 104 determines the waste for an item by subtracting the total items 316 by the demand for the items 308. For instance, the time period associated with the total items 316 may represent the shelf life associated with the items. As such, and as shown by the first data, the optimization component 104 may determine that the total waste 320 for Item "A" is "0" units, the total waste 320 for Item "B" is "20" units (e.g., (60−40)=20), and the total waste 320 for Item "C" is "0" units. In other words, using the assortment of items from FIG. 3A, "20" units of Item "B" may be wasted.

FIG. 3B illustrates an example of the optimization component 104 attempting to optimize the assortment of the items on the inventory location 302 in order to reduce the cost. For instance, and as shown, the optimization component 104 may determine a new assortment of the items on the inventory location 302, which is represented by second data 322 (which may also represent, and/or include, assortment data 118). As shown, the second data 322 represents the same identifiers 306 of the items, the same demands 308 for the items, the same widths 310 of the items, and the same lane capacities 312 for the items as the first data 304. However, the number of lanes 324 and the total items 326 represented by the second data 322 has changed. More specifically, the number of lanes 324 for Item "A" is now "3" lanes and the total capacity of Item "A" is "15" units, while the number of lanes 324 for Item "B" is "3" lanes and the total capacity of Item "B" is "36" units.

The optimization component 104 may then determine the new cost associated with the new assortment of items, which may be associated with restocks 328 of the items. In the example of FIG. 3B, the optimization component 104 may determine that the number of times that Item "A" will likely be restocked is "5" times (e.g., (50/(15*0.7))=4.762, which is rounded up). The optimization component 104 may also determine that the number of times that Item "B" will likely be restocked is "2" times (e.g., (40/(36*0.7))=1.59, which is rounded up). Finally, the optimization component 104 may perform a similar process to determine that the number of times that Item "C" is likely to be restocked is still "2" times (e.g., (10/(8*0.7))=1.786, which is rounded up).

Additionally, the optimization component 104 may determine a new cost associated with waste 330. In the example of FIG. 3B, the optimization component 104 may determine that the total waste 330 for Item "A" is "0" units, the total waste 330 for Item "B" is "0" units (e.g., (60−40)=20), and the total waste 330 for Item "C" is "0" units.

FIG. 3B illustrates an example of the optimization component 104 attempting to optimize the assortment of the items on the inventory location 302 in order to reduce the cost. For instance, and as shown, the optimization component 104 may determine a new assortment of the items on the inventory location 302, which is represented by second data 322 (which may also represent, and/or include, assortment data 118). As shown, the second data 322 represents the same identifiers 306 of the items, the same demands 308 for the items, the same widths 310 of the items, and the same lane capacities 312 for the items as the first data 304. However, the number of lanes 324 and the total items 326 represented by the second data 322 has changed. More specifically, the number of lanes 324 for Item "A" is now "3" lanes and the total capacity of Item "A" is "15" units, while the number of lanes 324 for Item "B" is "3" lanes and the total capacity of Item "B" is "36" units.

As shown by the example of FIGS. 3A-3B, by increasing the lanes for Item "A", the optimization component 104 is able to reduce the total number of times that Item "A" is restocked during the period of time from "8" times to "5" times. Additionally, the optimization component 104 is able to reduce the total number of times that all of the items are restocked during the period of time from "11" times to "9" times. Furthermore, the optimization component 104 is able to reduce the amount of waste that occurs with the items from "20" units to "0" units. As such, by assorting the items using the assortment illustrated in in FIG. 3B, the optimization component 104 may be able to reduce the total cost associated with the items.

In some examples, the optimization component 104 may continue to perform the processes described in FIG. 3B using different numbers of lanes for the items until the optimization component 104 identifies the assortment of items with the lowest cost and/or the maximum revenue. In some examples, the optimization component 104 may then generate assortment data 118 that represents the assortment of items with the lowest price for the facility.

In some examples, the optimization component 104 selects the items based on the items including the highest utility scores from items included in the category of items. For example, Item "A" may include Item "3" from the example of FIG. 2, Item "B" may include Item "4" from the example of FIG. 2, and Item "4" may include Item "5" from the example of FIG. 2. Additionally, or alternatively, in some examples, the optimization component 104 selects the items based on one or more rules. For a first examples, a rule may indicate that the optimization component 104 is to select Item "C" even if Item "C" does not include one of the highest utility scores. For a second example, a rule may indicate that the optimization component 104 is to select at least three different items from the category of items. Still, for a third example, a rule may indicate that the optimization component 104 is to select items with various prices. In such an example, Item "A" may include a high priced item with the highest utility score from the utility scores for the high priced items, Item "C" may include a medium priced item with the highest utility score from the utility scores for the medium priced items, and Item "C" may include a low priced item with the highest utility score from the utility scores for the low priced items.

In some examples, the optimization component 104 may further use the processes described above to recommend locations for placing the items within the facility. For a first example, the optimization component 104 may recommend placing Item "A" at a first location on the inventory location 302, Item "B" at a second location on the inventory location 302, and Item "C" at a third location on the inventory location 302. In some instances, the first location, the second location, and the third location correspond to the locations illustrated in FIG. 3B. For instance, the optimization component 104 may recommend that Item "B" be placed between Item "A" and Item "C". In other words, the optimization component 104 may specify the zone and/or inventory location for placing the items, along with the items' relative locations with respect to one another.

For a second example, the optimization component 104 may recommend placing Item "A" within a zone of the facility, Item "B" within the zone of the facility, and Item "C" within the zone of the facility. In other sores, the optimization component 104 may be less specific about the locations for placing the items. While these are just a couple techniques of the optimization component 104 recommend locations for placing the items, in other examples, the optimization component 104 may use additional and/or alternative techniques.

FIG. 4 illustrates an example user interface 402 that provides recommendations for selecting and placing items, according to examples of the present disclosure. In some examples, the assortment data 118 and/or the final assortment data 122 may represent the user interface 402. As shown, the user interface 402 may include rankings 404 of the items, product categories 406 associated with the items, merchant categories 408 associated with the items, identifiers 410 associated with the items, names 412 of the items, zones 414 for the items, and number of faceout(s) 416 (e.g., numbers of lane(s)) for the items.

In some examples, the rankings 404 may be based on the utility scores. For example, the item with the highest utility score may be ranked as "1", the item with the second highest utility score may be ranked as "2", the item with the third highest utility score may be ranked as "3", and so forth. In some examples, the rankings 404 may be based on the number of faceout(s) 416 for the items. For example, the item with the highest number of faceouts 416 may be ranked as "1", the item with the second highest number of faceouts 416 may be ranked as "2", the item with the third highest number of faceouts 416 may be ranked as "3", and so forth. While these are just a couple of example techniques for ranking the items, in other examples, the optimization component 104 may use additional and/or alternative techniques for ranking the items.

The product categories 406 may include the categories associated with the items. The categories may include, but are not limited to, sporting equipment, clothing, food, electronics, books, dishes, and/or any other type of category that may be associated with items. In some examples, the product categories 406 may include sub-categories. For example, and for the food category, the product categories 406 may include sandwiches, wraps, sodas, rice, meat, and/or any other sub-category that would be included in the food category.

The merchant categories 408 may include categories that are specific to the facility and/or the merchant. For example, the merchant categories 408 may include frozen foods, freshly prepared foods, and/or any other category. The zones 414 may indicate the areas within the facility for placing the items. For examples, the zones 414 may include freezer, refrigerator, sporting, clothing, and/or any other zone. Finally, the faceouts 416 may include the number of faceout(s) to provide for the items.

In some examples, the user interface 402 may allow the user to sort the items using one or more characteristics. For example, the user interface 402 may allow the user to sort the items based on product category 406, merchant category 408, or zone 414. In some examples, the user interface 402 may further include an interface element 418 for inputting the number of inventory locations (e.g., shelves) and/or the amount of space that is available for items. The user interface 402 may then automatically update to include the items that are recommended to be included on the inventory location(s) and/or within the available space. For example, and using the example of FIGS. 3A-3B, if a user input one inventory location into the interface element 418, the user interface 402 may update to include the three items recommended for the inventory location 302.

FIG. 5 illustrates a block diagram of an example architecture of system(s) 502, according to examples of the present disclosure. As shown, the system(s) 502 may include processor(s) 504, network interface(s) 506, and memory 508. In some examples, the system(s) 502 may include one or more additional components not illustrated in the example of FIG. 5. For example, the system(s) 502 may include input device(s), display(s), speaker(s), microphone(s), and/or any other type of component.

As shown, the memory 508 may store at least the preference component 102, the optimization component 104, the transaction data 106, the item data 108, the utility data 110, the space data 112, the dimensions data 114, the rules data 116, the assortment data 118, the review data 120, and the final assortment data 122. As such, in some examples, the system(s) 502 may be configured to perform the processing pipeline 100 described with respect to FIG. 1. However, in other examples, the system(s) 502 may not include the preference component 102 and/or the optimization component 104. In such examples, the system(s) 502 may be configured to communicate with other system(s) to perform the processing pipeline 100.

As further illustrated in the example of FIG. 5, the system(s) 502 may be configured to communicate with transaction system(s) 510 over network(s) 512. For instance, the transaction system(s) 510 may be configured to process transactions that occur at the facilities and/or the online marketplaces. As such, the system(s) 502 may receive, over the network(s) 512, the transaction data 106 from the transaction system(s) 510. However, in other examples, the functionality of the transaction system(s) 510 may be included in the system(s) 502.

Additionally, the system(s) 502 may be configured to communicate, over the network(s) 512, with computing device(s) 514(1)-(N) (also referred to as "computing device(s) 514"). In some examples, the computing device(s) 514 may be associated with facilities 516(1)-(N) (also referred to as "facilities 516"). As such, the system(s) 502 may be configured to receive, over the network(s) 512, data from the computing device(s) 514. The data may include, but is not limited to, the item data 108, the space data 112, the dimensions data 114, the rules data 116, and/or the review data 120. Additionally, the system(s) 502 may be configured to send, over the network(s) 512, data to the computing device(s) 514. The data may include, but is not limited to, the assortment data 118 and/or the final assortment data 122 for the facilities 516.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable messages between devices, such as the system(s) 502, the transaction system(s) 510, and the computing device(s) 514, as well as other networked devices. The network interface(s) may include one or more network interface controllers (NICs) or other types of transceiver devices to send and receive messages over network(s). For instance, each of the network interface(s) may include a personal area network (PAN) component to enable messages over one or more short-range wireless message channels. For instance, the PAN component may enable messages compliant with at least one of the following standards IEEE 902.15.4 (ZigBee), IEEE 902.15.1 (Bluetooth), IEEE 902.11 (WiFi), or any other PAN message protocol. Furthermore, each of the network interface(s) may include a wide area network (WAN) component to enable message over a wide area network.

Figure 6:
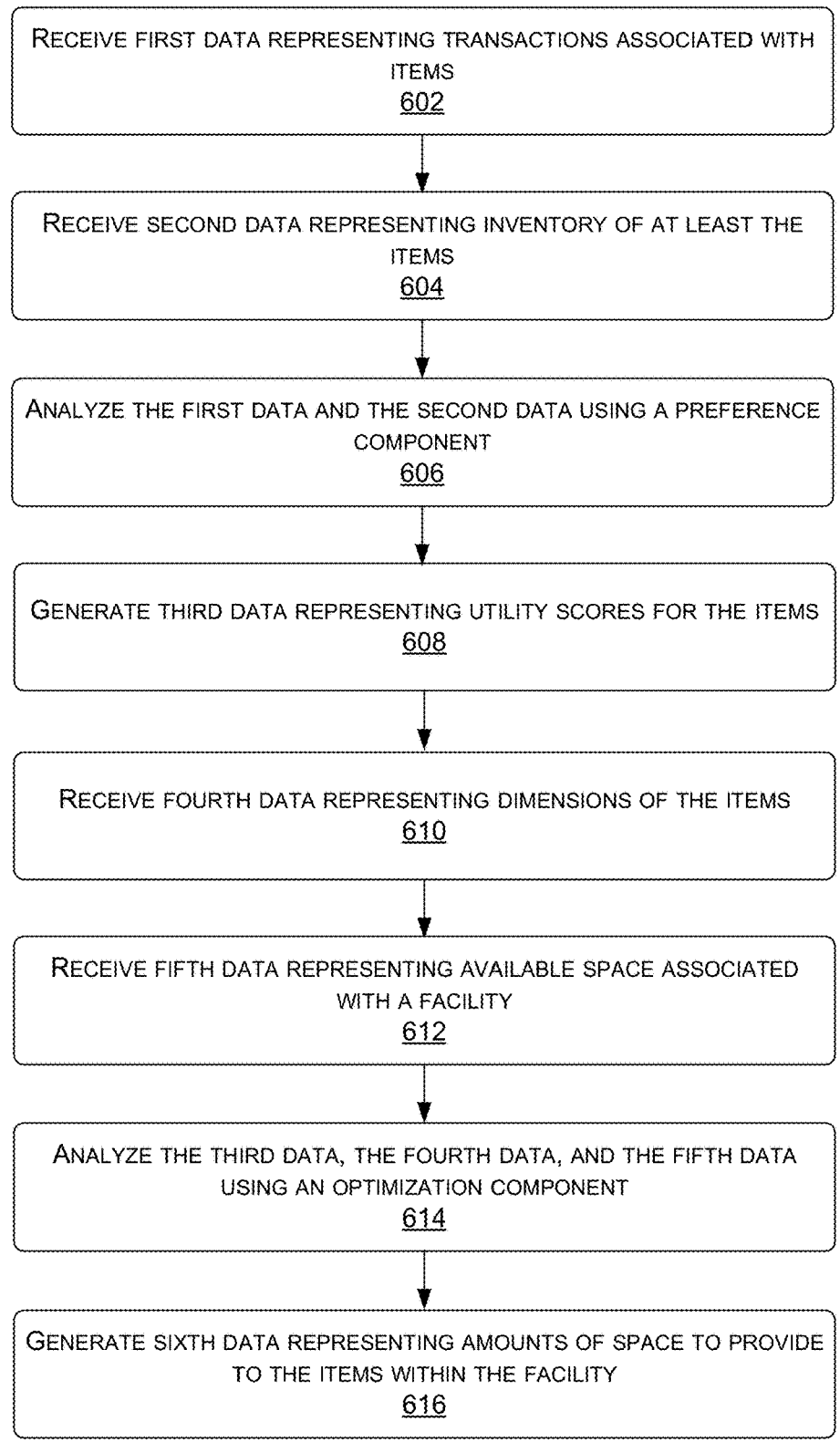
FIG. 6 is an example process for analyzing data in order to recommend items, according to examples of the present disclosure.
Figure 7:
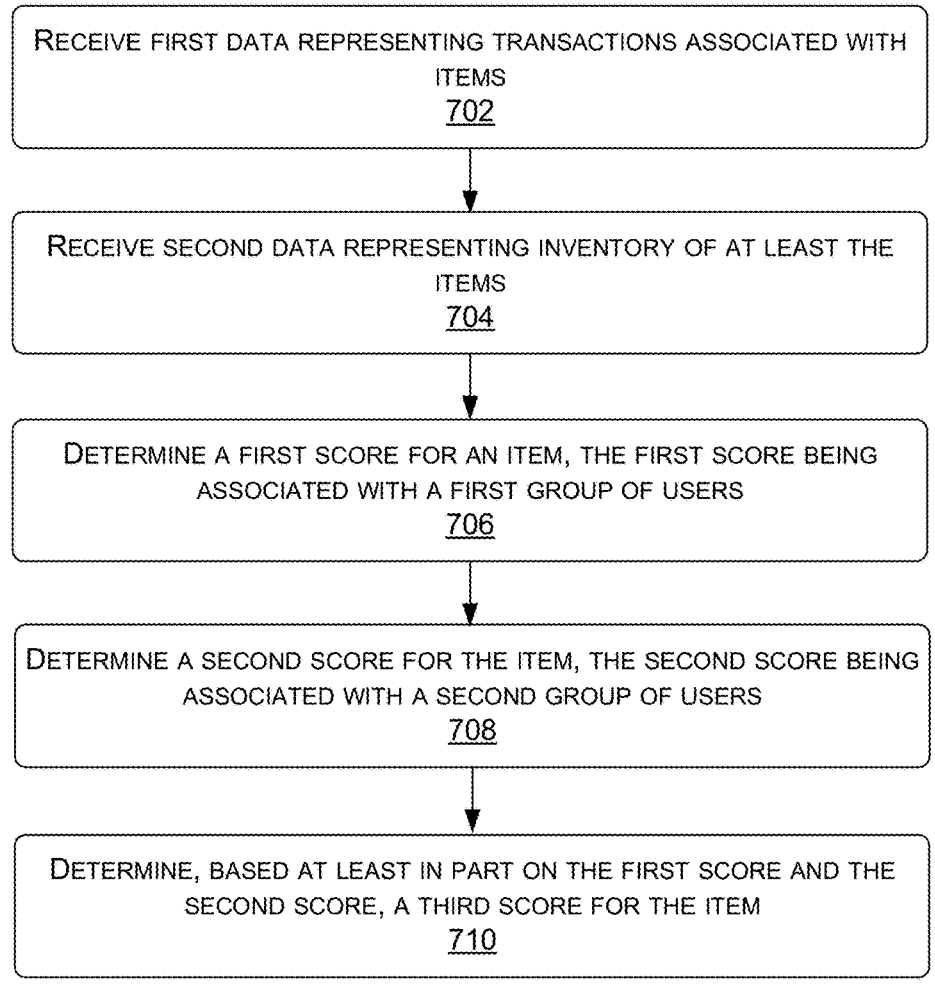
FIG. 7 is an example process for determining a final utility score for an item using utility scores associated with various groups of users, according to examples of the present disclosure.
Figure 8:
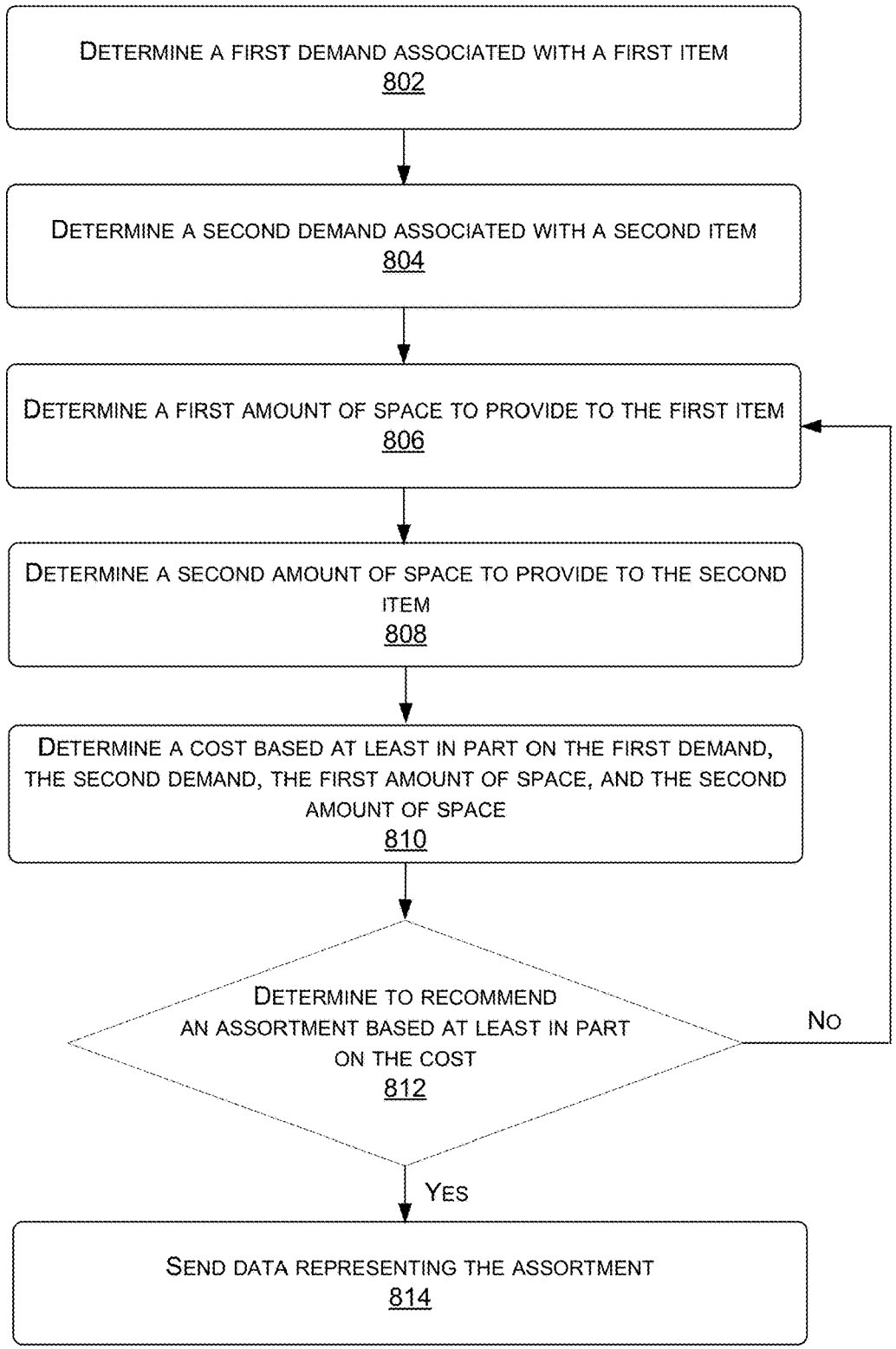
FIG. 8 is an example process for determining an assortment of items, according to examples of the present disclosure.

FIGS. 6-8 illustrate various processes for implanting the techniques described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 6 is an example process 600 for analyzing data in order to recommend items, according to examples of the present disclosure. At 602, the process 600 may include receiving first data representing transactions associated with items. For example, the system(s) 502 may receive the first data (e.g., transaction data) representing the transactions. In some examples, the first data represents transactions that occurred within a facility. In some examples, the first data represents transactions that occurred within more than one facility. For example, the first data may represent transactions that occurred within a geographic area, such as neighborhood, city, state, country, and/or the like. In some examples, the first data represents transactions that occurred between a range that includes a starting date and time and an ending date and time.

At 604, the process 600 may include receiving second data representing inventory of at least the items. For instance, the system(s) 502 may receive the second data representing the inventory. In some examples, the second data represents inventory of items at the facility. In some examples, the second data represents inventories of items at the more than one facility. Still, in some examples, the second data represents inventories of items between a range that includes the starting date and time and the ending date and time.

At 606, the process 600 may include analyzing the first data and the second data using a preference component and at 608, the process 600 may include generating third data representing utility scores for the items. For instance, the system(s) 502 may input the first data and the second data into the preference component. The preference component may then analyze the first data and the second data and, based on the analysis, generate the third data representing the utility scores for the items. As described above, the preference component may initially generate utility scores for various groups of users. The preference component may then use the utility scores, along with weights associated with the various groups of users, to determine the final utility scores for the items.

At 610, the process 600 may include receiving fourth data representing dimensions of the items and at 612, the process 600 may include receiving fifth data representing available space associated with a facility. For instance, the system(s) 502 may receive the fourth data representing the dimensions, such as the heights, lengths, and widths of the items. The system(s) 502 may also receive the fifth data representing the available space. In some examples, the available space is for all of the items that will be provided within the facility. In some examples, the available space is specific to a category of items. For example, the available space may indicate the available freezer space, the available refrigerator space, and/or the like.

At 614, the process 600 may include analyzing the third data, the fourth data, and the fifth data using an optimization component and at 616, the process 600 may include generating sixth data representing amounts of space to provide to the items within the facility. For instance, the system(s) 502 may input at least the third data, the fourth data, and the fifth data into the optimization component. The optimization component may then analyze the third data, the fourth data, and the fifth data and, based on the analysis, generate the sixth data representing the amounts of space to provide to the items. As described above, the optimization component determines the assortment of items (e.g., the amounts of space to provide to the items) in order to both maximize the attribute coverage within the available space and maximize the profit for the facility.

It should be noted that, in some examples, the system(s) 502 may further receive and input, into the optimization component, seventh data representing one or more rules for assorting the items. Additionally, in some examples, after determining the assortment of items, the system(s) 502 may receive inputs representing one or more changes to the assortment of items. The system(s) 502 may then update the assortment of items using the one or more changes in order to generate a final assortment of items for the facility. Furthermore, in some examples, the system(s) 502 may repeat the process 600 starting back at 602 in order to continue generating updated assortments of items for the facility.

FIG. 7 is an example process 700 for determining a final utility score for an item using scores associated with various groups of users, according to examples of the present disclosure. At 702, the process 700 may include receiving first data representing transactions associated with items. For example, the system(s) 502 may receive the first data (e.g., transaction data) representing the transactions. In some examples, the first data represents transactions that occurred within a facility. In some examples, the first data represents transactions that occurred within more than one facility. For example, the first data may represent transactions that occurred within a geographic area, such as neighborhood, city, state, country, and/or the like. In some examples, the first data represents transactions that occurred between a range that includes a starting date and time and an ending date and time.

At 704, the process 700 may include receiving second data representing inventory of at least the items. For instance, the system(s) 502 may receive the second data representing the inventory. In some examples, the second data represents inventory of items at the facility. In some examples, the second data represents inventories of items at the more than one facility. Still, in some examples, the second data represents inventory of items between a range that includes the starting date and time and the ending date and time.

At 706, the process 700 may include determining a first score for an item, the first score being associated with a first group of users. For instance, and as discussed above, the system(s) 502 may use various attributes to generate the various groups of users. For instance, the first group of users may be associated with unique preferences of attributes and/or items. As such, the system(s) 502 may determine the first score based at least in part on the unique preferences of attributes and/or items associated with the first group of users, the attributes associated with the item, the transactions associated with the item, the transactions associated with similar items, the inventory associated with the item, the inventory associated with the similar items, and/or the like.

At 708, the process 700 may include determining a second score for the item, the second score being associated with a second group of users. For instance, the second group of users may be associated with unique preferences of attributes and/or items. As such, the system(s) 502 may determine the second score based at least in part on the unique preferences of attributes and/or items associated with the second group of users, the attributes associated with the item, the transactions associated with the item, the transactions associated with the similar items, the inventory associated with the item, the inventory associated with the similar items, and/or the like.

At 710, the process 700 may include determining, based at least in part on the first score and the second score, a third score for the item. For instance, the system(s) 502 may determine the third score using at least the first score and the second score. In some examples, the system(s) 502 further determine the third score using a first weight associated with the first group of users and a second weight associated with the second group of users. For example, the system(s) 502 may determine the third score by weighing the first score using the first weight and weighing the second score using the second weight. As described above, the system(s) 502 may determine the weights based on the expected number of users that the system(s) 502 determine will visit the facility from the various groups of users.

FIG. 8 is an example process 800 for determining an assortment of items, according to examples of the present disclosure. At 802, the process 800 may include determining a first demand associated with a first item and at 804, the process 800 may include determining a second demand associated with a second item. For instance, the system(s) 502 may determine the first demand and the second demand. In some examples, the system(s) 502 determine the first demand using at least a first utility score associated with the first item and determine the second demand using at least a second utility score associated with the second item. Additionally, or alternatively, in some examples, the system(s) 502 determine the first demand and/or the second demand using transaction data associated with the first item and/or the second item.

At 806, the process 800 may include determining a first amount of space to provide to the first item and at 808, the process 800 may include determining a second amount of space to provide to the second item. For instance, the system(s) 502 may determine the first amount of space and the second amount of space. In some examples, the system(s) 502 determine the first amount of space and/or the second amount of space based on first dimensions of the first item, second dimensions of the second item, dimensions of an inventory location that is associated with the items, and/or one or more rules. In some examples, the first amount of space may correspond to a first number of faceouts associated with the first item and the second amount of space may correspond to a second number of faceouts associated with the second item.

At 810, the process 800 may include determining a cost based at least in part on the first demand, the second demand, the first amount of space, and the second amount of space. For instance, the system(s) 502 may determine the cost for the assortment. In some examples, to determine the cost, the system(s) 502 determine a first number of the first item that may be placed on the inventory location using the first amount of space and a second number of the second item that may be placed on the inventory location using the second amount of space. The system(s) 502 then use the first demand and the first number to determine a first number of restocks associated with the first item over a period of time and use the second demand and the second number to determine a second number of restocks associated with the second item over the period of time. Using at least the first number of restocks and the second number of restocks, the system(s) 502 then determine the cost.

At 812, the process 800 may include determining whether to recommend an assortment based at least in part on the cost. For instance, the system(s) 502 may determine whether to recommend the assortment that includes the first amount of space for the first item and the second amount of space for the second item based on the cost. In some instances, the system(s) 502 may determine to recommend the assortment based on the cost being less than a threshold cost. In some instances, the system(s) 502 may determine to recommend the assortment based on the cost including a minimum cost from among costs associated with assortments. Still, in some instances, the system(s) 502 may determine to recommend the assortment based on determining a revenue potential that is based on the cost and then determining that the revenue potential includes a maximum revenue potential.

If, at 812, it is determined not to recommend the assortment, then the process 800 may repeat starting back at 806. For instance, if the system(s) 502 determine not to recommend the assortment, then the system(s) 502 may repeat the process 500 starting back to 806. For example, the system(s) 502 may determine a new first amount of space to provide to the first item and a new second amount of space to provide to the second item. The system(s) 502 may then determine a new cost associated with a new assortment that includes the new first amount of space and the new second amount of space. Additionally, the system(s) 502 may determine whether to recommend the new assortment based on the new cost.

However, if, at 812, it is determined to recommend the assortment, then at 814, the process 800 may include sending data representing the assortment. For instance, if the system(s) 502 determine to recommend the assortment, then the system(s) 502 may send the data representing the assortment to one or more computing devices. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more processors; and
one or more computer-readable media storing instructions that, when executed by the one or more processors, cause the system to perform operations comprising:
receiving transaction data associated with items at a facility, the transaction data representing at least:
first sales associated with a first item at the facility; and
second sales associated with a second item at the facility;
receiving inventory data associated with the facility, the inventory data representing at least:
a first inventory associated with the first item at the facility; and
a second inventory associated with the second item at the facility;
analyzing the transaction data and the inventory data using a preference component comprising a first machine learning model trained to generate utility data in response to the transaction data and the inventory data, the utility data representing at least:
a first utility score associated with a predicted sales potential of the first item at the facility; and
a second utility score associated with a predicted sales potential of the second item at the facility;
receiving dimensions data associated with the items at the facility, the dimensions data representing at least:
first dimensions associated with the first item; and
second dimensions associated with the second item;
analyzing the utility data and the dimensions data using an optimization component comprising a second machine learning model trained to generate assortment data in response to the utility data and the dimensions data, the assortment data representing at least:
a first amount of space to provide for displaying the first item at the facility; and
a second amount of space to provide for displaying the second item at the facility; and
providing the assortment data to an inventory management system of the facility, the assortment data representing a first recommendation for placement of the first item at the facility and a second recommendation for placement of the second item at the facility.

2. The system as recited in claim 1, wherein analyzing the transaction data and the inventory data using the preference component comprises at least:
based at least in part on sales represented by the transaction data and inventory represented by the inventory data, determining at least:
a third utility score associated with the first item, the third utility score being for a first group of users;
a fourth utility score associated with the second item, the fourth utility score being for the first group of users;
a fifth utility score associated with the first item, the fifth utility score being for a second group of users; and
a sixth utility score associated with the second item, the sixth utility score being for the second group of users;
a first weight associated with a probability that a user is in the first group of users; and
a second weight associated with a probability that the user is in the second group of users;
determining the first utility score associated with the first item based at least in part on the third utility score, the fifth utility score, the first weight, and the second weight; and
determining the second utility score associated with the second item based at least in part on the fourth utility score, the sixth utility score, the first weight, and the second weight.

3. The system as recited in claim 1, wherein analyzing the utility data and the dimensions data using the optimization component comprises at least:
determining, based at least in part on first utility score, the first dimensions, and the first amount of space, a first number of times that the first item would likely be restocked over a period of time;
determining, based at least in part on the second utility score, the second dimensions, and the second amount of space, a second number of times that the second item would likely be restocked over the period of time;
determining a cost based at least in part on the first number of times and the second number of times;
determining to recommend the first amount of space based at least in part on the cost; and
determining to recommend the second amount of space based at least in part on the cost.

4. A method comprising:
receiving first data representing at least one or more transactions associated with an item at a facility;
receiving second data representing an inventory of items associated with at least the facility;
generating, based at least in part on the one or more transactions and the inventory of items and using a first machine-learned model trained using transaction data tagged with score data representing predicted sales potential for the item, third data representing a score for the item associated with a predicted sales potential for the item;
receiving fourth data representing one or more characteristics associated with the item, the one or more characteristics comprising a size and a weight of the item;
determining, based on the score and using a second machine-learned model, a first recommended location within the facility for presenting the item; and
determining, based on the score, the first recommended location, and the one or more characteristics associated with the item and by using a third machine-learned model,
fifth data representing at least an amount of space to provide for the item at the first recommended location.

5. The method as recited in claim 4, wherein the score is a first score, and wherein generating the third data comprises at least:
  determining, based at least in part on the one or more transactions and the inventory of items and using a third machine-learned model, a second score for the item, the second score being associated with a preference for the item among a first group of users;
  determining, based at least in part on the one or more transactions and the inventory of items and using the third machine-learned model, a third score for the item, the third score being associated with a preference for the item among a second group of users;
  determining the first score by assigning a first weight associated with the first group of users to the second score and a second weight associated with the second group of users to the third score; and
  generating the third data to represent the first score.

6. The method as recited in claim 5, wherein the first data further represents transactions associated with items at the facility, the items including at least the item, and wherein the method further comprises:
  receiving sixth data representing attributes associated with the items;
  determining the first group of users based at least in part on the transactions and the attributes, the first group of users preferring a first portion of the attributes; and
  determining the second group of users based at least in part on the transactions and the attributes, the second group of users preferring a second portion of the attributes.

7. The method as recited in claim 5, further comprising:
  determining a first weight associated with the first group of users; and
  determining a second weight associated with the second group of users,
  and wherein determining the first score is further based at least in part on the first weight and the second weight.

8. The method as recited in claim 7, further comprising:
  determining that one or more first users associated with the first group of users will likely include a first percentage of total users at the facility;
  determining that one or more second users associated with the second group of users will likely include a second percentage of the total users at the facility;
  determining the first weight based at least in part on the first percentage of the total users; and
  determining the second weight based at least in part on the second percentage of the total users.

9. The method as recited in claim 4, further comprising:
  receiving sixth data representing one or more additional transactions associated with an additional item at the facility,
  and wherein generating the third data is further based at least in part on the one or more additional transactions.

10. The method as recited in claim 9, further comprising:
  determining that the item is associated with a category of items;
  determining that the additional item is also associated with the category of items; and
  based at least in part on the additional item also being associated with the category of items, determining to generate the third data using the one or more additional transactions.

11. The method as recited in claim 4, further comprising:
  determining the amount of space;
  determining, based at least in part on the score, the one or more characteristics, and the amount of space, a cost associated with the item; and
  determining to recommend the amount of space for the item based at least in part on the cost.

12. The method as recited in claim 11, wherein determining the cost associated with the item comprises at least:
  determining, based at least in part on the score, a demand associated with the item at the facility;
  determining, based at least in part on the amount of space and the one or more characteristics, a first number of items that can be placed on an inventory location;
  determining, based at least in part on the first number of items, a second number of items that are removed before restocking the item; and
  determining the cost based at least in part on the demand and the second number of items.

13. The method as recited in claim 11, wherein determining the cost associated with the item comprises at least:
  determining a demand for the item based at least in part on the score;
  determining a first number of units of the item that may be placed on an inventory location based at least in part on the amount of space and the one or more characteristics;
  determining a second number of units of the item that may spoil based at least in part on the demand and the first number of units; and
  determining the cost based at least in part on the second number of units.

14. The method as recited in claim 4, further comprising:
  generating sixth data representing an additional score for an additional item; and
  receiving seventh data representing one or more additional characteristics associated with the additional item,
  and wherein generating the fifth data is further based at least in part on the additional score and the one or more additional characteristics.

15. The method as recited in claim 14, wherein generating the fifth data comprises at least:
  determining, based at least in part on the score, a first demand associated with the item;
  determining, based at least in part on the additional score, an additional demand associated with the additional item;
  determining a first cost associated with the item based at least in part the amount of space and the first demand;
  determining a second cost associated with the additional item based at least in part on an additional amount of space associated with the additional item and the second demand;
  determining to recommend the amount of space based at least in part on the first cost and the second cost; and
  generating the fifth data representing the amount of space.

16. The method as recited in claim 4, further comprising:
  receiving sixth data representing one or more business rules associated with items at the facility,
  and wherein generating the fifth data is further based at least in part on the one or more business rules.

17. The method as recited in claim 4, further comprising:
  receiving sixth data representing an amount of available space associated with a category of items, the item being included in the category of items, and wherein generating the fifth data is further based at least in part on the amount of available space.

18. The method as recited in claim 4, further comprising determining a first cost comprising a restock frequency associated with the first recommended location in the facility, and wherein determining the fifth data is further based on the first cost.

19. A system comprising:
one or more processors; and
one or more computer-readable media storing instructions that, when executed by the one or more processors, cause the system to perform operations comprising:
receiving first data representing at least one or more transactions associated with an item at a facility;
receiving second data representing an inventory of items associated with at least the facility;
generating, based at least in part on the one or more transactions and the inventory of items and using a first machine-learned model trained using transaction data tagged with score data representing predicted sales potential for the item, third data representing a score for the item associated with a predicted sales potential for the item;
receiving fourth data representing one or more characteristics associated with the item, the one or more characteristics comprising a size and a weight of the item;
determining, based on the score and using a second machine-learned model, a first recommended location within the facility for presenting the item; and
determining, based on the score, the first recommended location, and the one or more characteristics associated with the item and by using a third machine-learned model,
fifth data representing at least a location for placing the item at the first recommended location.

20. The system as recited in claim 19, the operations further comprising generating, based at least in part on the score and the one or more characteristics, sixth data representing an amount of space to provide to the item within the facility.

\* \* \* \* \*